Figure 3:
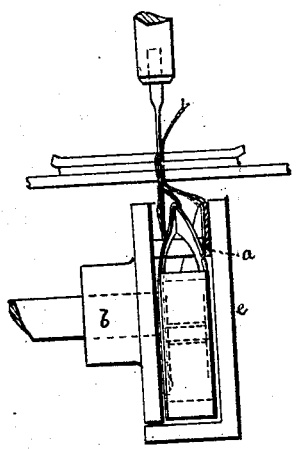

2 Sheets--Sheet 1.
E. KAPPMEYER.
Sewing-Machine.
No. 159,183.  Patented Jan. 26, 1875.

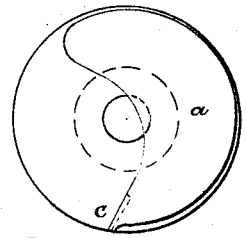
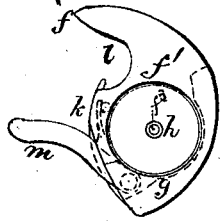
Witnesses
Chas. J. Koch
E. M. Shoffer
Inventor
Edward Kappmeyer
by Colborne Brook
his attorney E. KAPPMEYER.
Sewing-Machine.

No. 159,183.

2 Sheets--Sheet 2.

Patented Jan. 26, 1875.

Witnesses
Chas Koock
E. M. Brookes

Inventor
Eduard Kappmeyer
by Colborne Brookes
his Attorney

UNITED STATES PATENT OFFICE.

EDWARD KAPPMEYER, OF HAMBURG, GERMANY.

IMPROVEMENT IN SEWING-MACHINES.

Specification forming part of Letters Patent No. 159,183, dated January 26, 1875; application filed May 15, 1874.

*To all whom it may concern:*

Be it known that I, EDWARD KAPPMEYER, of Hamburg, Germany, have invented certain Improvements in Sewing-Machines; and I do hereby declare that the following is a full, clear, and exact description of the same, reference being had to the annexed drawings making a part of the same.

This invention relates to a means of effecting lock-stitch in sewing-machines by the use of a rotating shuttle, in combination with a loop-protector caused to revolve on the one side of the fabric to be sewed, in a manner somewhat similar to that in which the revolving hook in the machines commonly known as Wheeler and Wilson's sewing-machines is made to operate.

In the Wheeler and Wilson machine a spool containing the under thread is placed loosely in the framing immediately under the needle, and a crank-hook fixed on a horizontal shaft is made to rotate round the spool in such a manner as to draw round it a loop of the upper thread from the eye of the needle.

In my novel arrangement the horizontal shaft carries a bent plate, which I call a loop-protector, and which is secured to a disk on the shaft at two points, leaving a space between it and the disk, into which space the shuttle is partly inserted. The loop-protector and shuttle are inclosed within a cylindrical casing, one part of the periphery of which is made to open for the insertion or removal of the shuttle. The shuttle consists of two side plates with a space between them for receiving a spool. These side plates are at one end separated by a stud, and at the other end, where they are made of a hooked form, they are bent so that their ends are brought together and riveted or soldered, so as to form one nose to the hook. The disk-shaped spool containing the under thread is inserted between the two side plates of the shuttle, and the thread is passed through an eye and guide-hole in the side of the shuttle. The shuttle containing the spool is inserted between the disk on the horizontal shaft and the loop-protector. The rotation of the shaft is so timed to the movement of the needle that when the latter begins to ascend, forming a bulge of the upper thread, the hook of the shuttle enters this bulge, and, swelling it as it advances, carries the spool through the loop of the upper thread. When the under thread has thus been passed through the loop of the upper thread, the needle again descending partly draws up the slack of the loop, which the loop-protector pushes aside, so as to keep it clear of the advancing hook of the shuttle. The shuttle enters the fresh bulge of the upper thread, and, in swelling it, fully draws up the slack of the former loop, thereby causing the upper and lower threads to be locked together in the body of the fabric. The plate constituting the loop-protector and the plates of the shuttle are bent and curved in such a manner as to effect the operation described above without permitting entanglement of the one thread or loop with the other, swelling the loop, holding it for a time to insure the proper tightness of the stitch, and then delivering it, keeping it clear of the advancing shuttle, and finally drawing it up to close the stitch.

The mechanism described above may be applied to machines of the Wheeler and Wilson kind by simply substituting it for the crank-hook, spool, and holder existing in such machines; or other sewing-machines may be altered so as to operate in the manner described above by providing a horizontal under shaft fitted with the mechanism; or new machines may be constructed with the novel mechanism for effecting the lock-stitch, the other parts, such as the movement of the needle, the feed, and fittings generally being of any known construction; but That my invention may be fully understood I will proceed to describe the same in detail by aid of the accompanying drawings.

Figure 1:
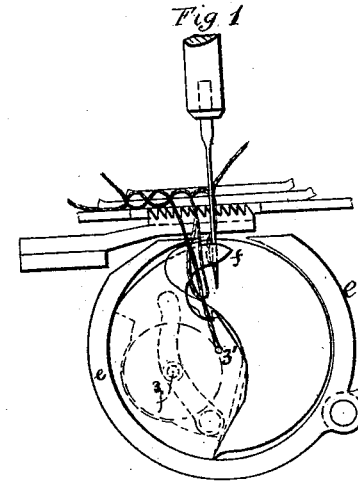
Figure 2:
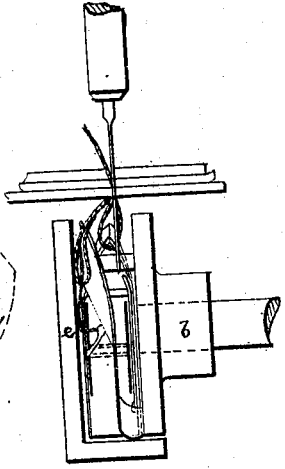
Figure 4:
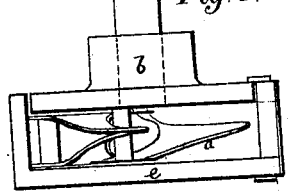
Figure 5:
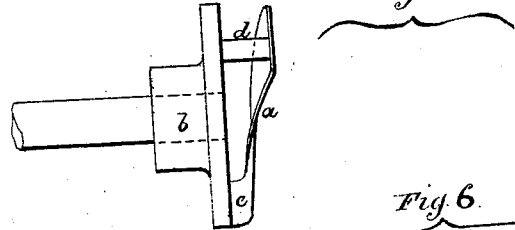
Figure 6:
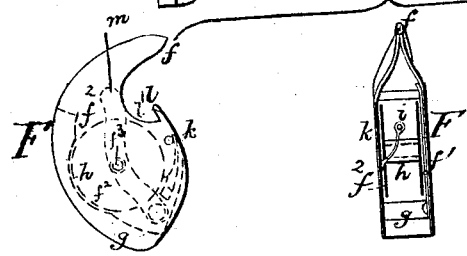

Figure 1 represents a transverse section through the casing of the revolving shuttle. Figs. 2 and 3 represent longitudinal sections viewed from opposite sides, and Fig. 4 represents a sectional plan. Fig. 5 shows, by side and front views, the revolving disk with the loop-protector on it; and Fig. 6 shows a section and back and front views, detached, of the shuttle and spool, which in Figs. 1, 2, 3, and 4 are shown in working position. Figs. 7, 8, 9, and 10 show, to an enlarged scale, the positions of the parts in relation to the needle and threads at four different points of a revolution.

The rotating disk $b$ is fixed on the horizontal spindle B, and the loop-protector $a$, which is a piece of thin sheet metal, such as steel, bent as shown, is secured by the disk at $c$ by bending back a portion of the protector to form a lip, and inserting this lip in a slit in the disk, where it may be soldered, and also by a pin, $d$, which projects from the disk and is riveted to the protector-plate $a$. The lip $c$ and the pin $d$ form stops for the shuttle, the former acting as its driver when it is inserted.

The shuttle F consists of two thin side plates, $f^1 f^2$, kept apart by and secured to a stud or back piece, $g$, which may preferably be of boxwood, ebonite, or such like material, for the sake of lightness, and to diminish friction and noise when the shuttle revolves within its casing, on the interior of which this back piece rubs. The two side plates $f^1 f^2$ of the shuttle are brought together and riveted, to form the nose $f$.

The spool $h$ consists of two thin disks, secured to a tube in their center. It is inserted into the shuttle through a circular hole in one of the side plates thereof onto a pin, $f^3$, projecting inward from the other side plate. After being inserted, the spool is prevented from coming out by turning a piece, $m$, so as to intercept the hole through which it was introduced. This piece $m$ is jointed to the side plate of the shuttle, on the inside thereof.

The thread of the spool is passed through an eye, $i$, in the middle of the shuttle, and through a hole, $k$, in such a position on one of its sides that, when the shuttle is in working position, this hole for the thread is nearly in the center of rotation.

The disk $b$, with its loop-protector $a$, are inclosed within a cylindrical casing, $e$, the part $e^4$ of the periphery of which is hinged to open (as shown by the dotted lines $e^1$, Fig. 1) for the insertion of the shuttle, which is placed so that the lower end of the piece $g$ rests against the lip $c$ of the protector-plate, while the hollow of the shuttle-hook bears on the pin $d$. The shuttle is made to fit loosely in this position, so that there is room for the loop of the thread, which it engages, to pass freely between the shuttle and its bearing-points, as well as between the back of the stud $g$ and the interior surface of the casing $e$.

Figure 7:
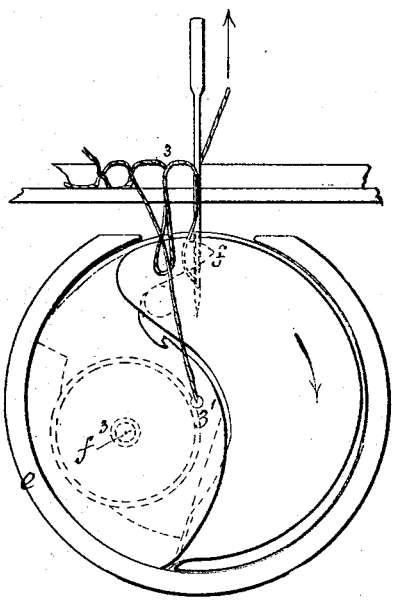

The action of the apparatus will be understood by referring to Figs. 7, 8, 9, and 10, of which Fig. 7 shows the hook of the shuttle just engaged with the bulge formed in the upper thread as the needle begins to ascend, the preceding loop of the needle-thread from the hole 3' having had the shuttle-thread passed through it, and being held aside, as shown in Figs. 2 and 3, by the loop-protector out of the reach of the needle or of the shuttle-hook, so as to prevent the entanglement of one loop with another.

Figure 8:
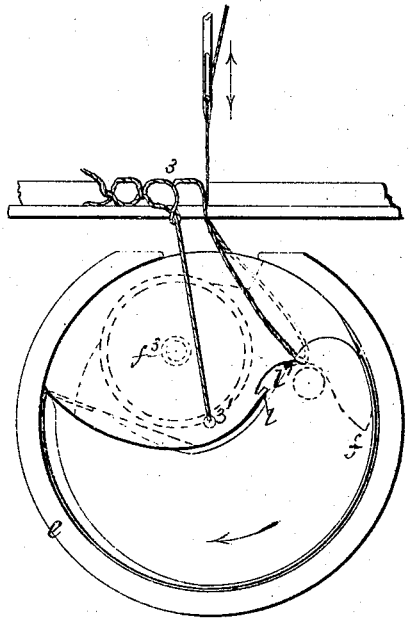

Fig. 8 shows the shuttle-hook advanced about one-quarter of a revolution, with the last loop of the needle-thread engaged on it, and the preceding loop from hole 3 nearly drawn up by the extension of the latter loop. At this time the needle is about at the upper extremity of its stroke.

Figure 9:
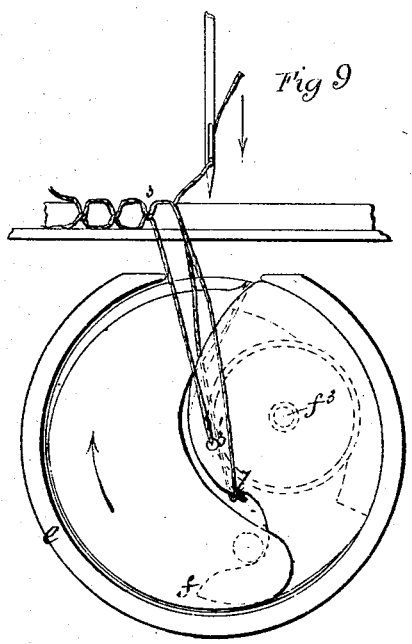

Fig. 9 shows the shuttle still farther advanced—about half round—with the shuttle-thread drawn tight up into the hole 3, and about to enter the loop of the needle-thread. To effect the drawing up of the shuttle-thread for completion of the stitch 3, a projection, $l$, is provided, which forms a notch, $l'$, on the edges of the shuttle-plates, which notch prevents the loop from slipping along those edges until it is so far extended as to draw up completely the preceding loop. The needle, it will be seen is now descending.

Figure 10:
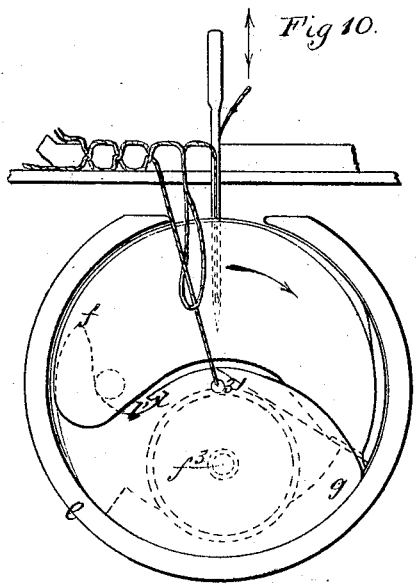

Fig. 10 shows the shuttle advanced about three-quarters round, the needle being about the lower extremity of its stroke, and the shuttle-thread having passed through the last loop. This action is repeated at each revolution of the disk $b$, during which the needle makes an up and a down stroke; and the fabric being fed onward in any known manner, a series of lock-stitches are then effected, as is well understood.

Having thus described my invention, what I claim, and desire to secure by Letters Patent, is—

The combination, with the cylindrical casing $e$, provided with a hinged portion, $e^2$, a revolving disk, $b$, forming one side of the casing $e$, and a loop-protector, $a$, provided with a lip, $c$, and pin $d$, as described, of the hooked shuttle F, constructed of plates $f^1 f^2$, and having a back piece, $g$, nose $f$, projection $l$, notch $l'$, pin $f^3$, and turning piece $m$, all constructed and operating substantially as described.

In witness whereof I have hereunto signed my name in the presence of two subscribing witnesses.

E. KAPPMEYER.

Witnesses:
W. MEYER,
T. C. W. MEYN.